United States Patent [19]

Kondziola

[11] 4,300,731
[45] Nov. 17, 1981

[54] BELT ROLL-UP RETRACTOR

[75] Inventor: Joseph D. Kondziola, Troy, Mich.

[73] Assignee: General Motors Corporation, Detroit, Mich.

[21] Appl. No.: 152,353

[22] Filed: May 22, 1980

[51] Int. Cl.³ .................. A62B 35/02; B65H 75/48
[52] U.S. Cl. ................... 242/107.2; 242/107.4 A; 280/806
[58] Field of Search .............. 242/107.2, 107.4 R, 242/107.4 E; 280/801–808; 297/474–480

[56] References Cited

U.S. PATENT DOCUMENTS

| | | | |
|---|---|---|---|
| 3,240,510 | 3/1966 | Spouge | 242/107.2 X |
| 3,261,568 | 7/1966 | McFarlane | 242/107.2 |
| 3,323,831 | 6/1967 | Buechler | 242/107.2 X |
| 3,389,874 | 6/1968 | Van Noord | 242/107.2 |
| 3,533,659 | 10/1970 | Major | 297/479 |
| 3,534,190 | 10/1970 | Lindblad | 280/806 X |
| 3,551,961 | 1/1971 | Nygren | 242/107.2 X |
| 3,847,434 | 11/1974 | Weman | 242/107.2 X |
| 4,032,174 | 6/1977 | Andres et al. | 297/480 |
| 4,120,466 | 10/1978 | Adomeit | 242/107.2 |
| 4,206,886 | 6/1980 | Yoshitsugu et al. | 242/107.2 |

*Primary Examiner*—John M. Jillions
*Attorney, Agent, or Firm*—Charles E. Leahy

[57] ABSTRACT

A belt roll-up and clamp mechanism for limiting the spool-out of belt from the belt reel of a vehicle sensitive inertia locking retractor. The belt roll-up and clamp mechanism includes a spindle having pinion gears attached to opposite ends of a pair of bars which are spaced apart to define a slot through which the belt passes. The pinion gears mesh with toothed racks on the retractor housing which effect rotation of the spindle simultaneously with linear movement of the spindle along the toothed racks. A spring normally biases the spindle to the end of the rack furthest from the reel and to a rotary position which permits the belt to pass through the slot and slide around one of the bars during normal winding and unwinding of the belt from the reel. The imposition of occupant restraint load on the belt subsequent to reel lockup by a vehicle inertia sensor causes the spindle to move linearly and rotationally along the racks so that the belt is rolled up around the spindle bars to limit the extension of the belt from the reel. One of the spindle bars is preferably movable relative the other bar so that roll-up of the belt squeezes the movable bar toward the fixed bar to clamp the belt therebetween.

6 Claims, 9 Drawing Figures

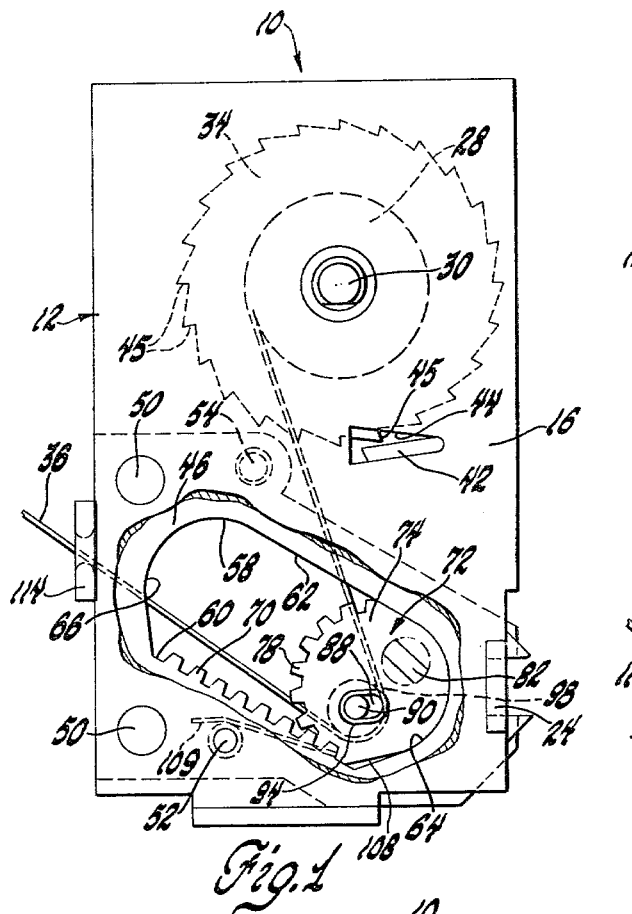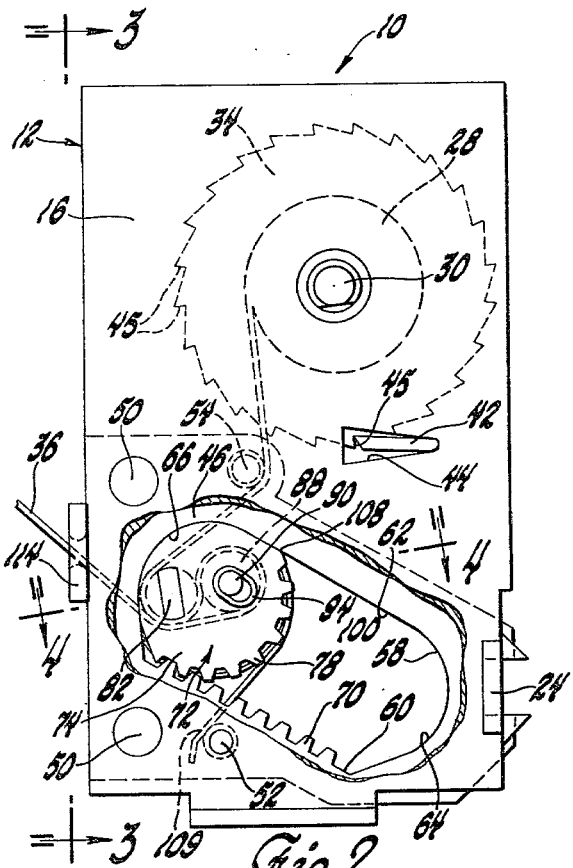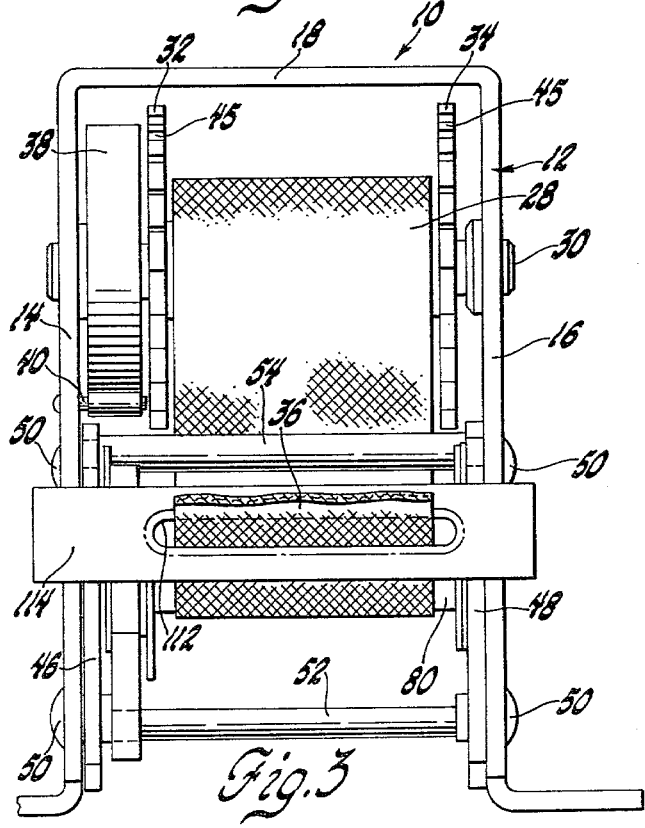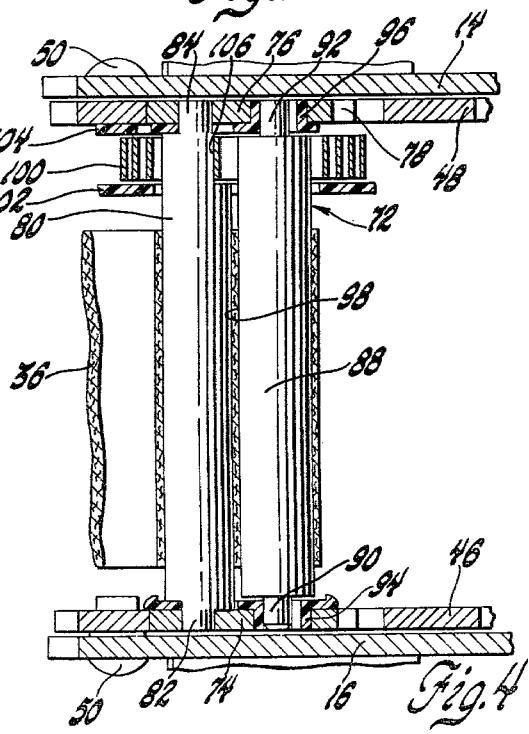

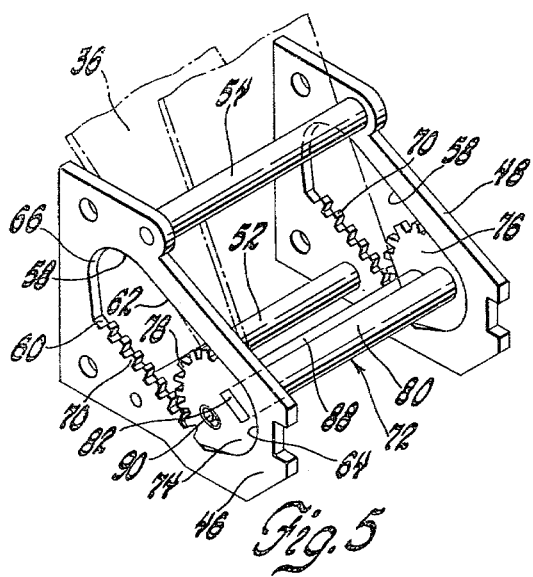
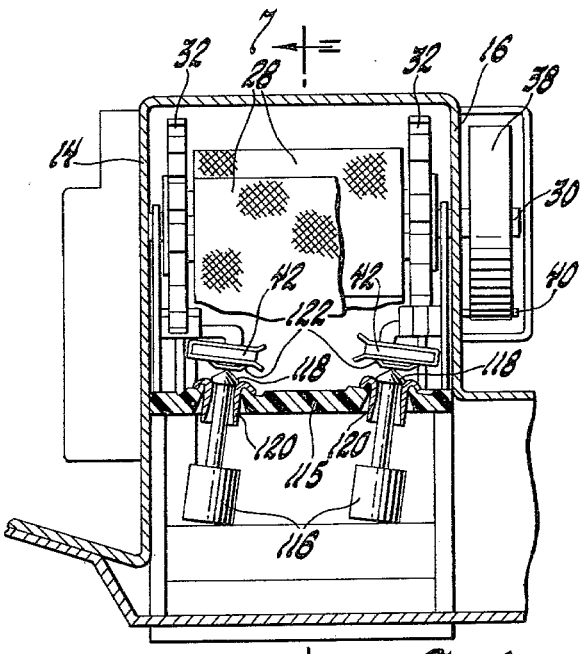
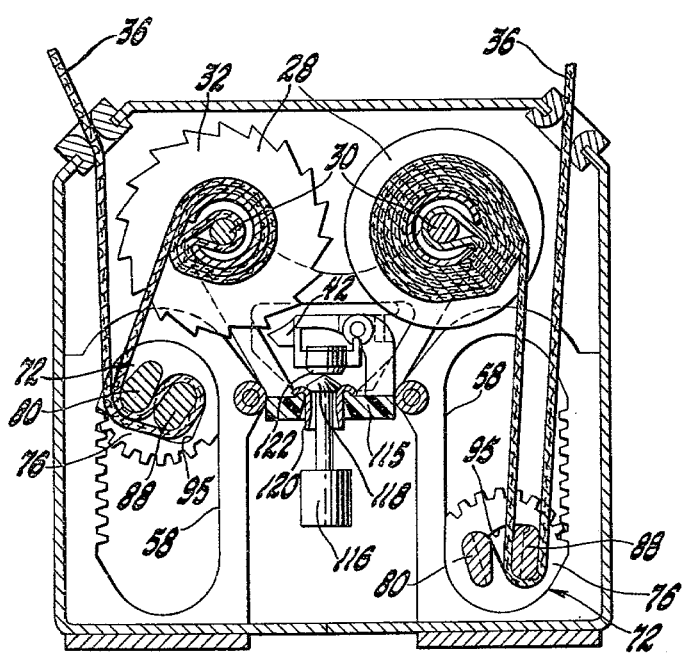
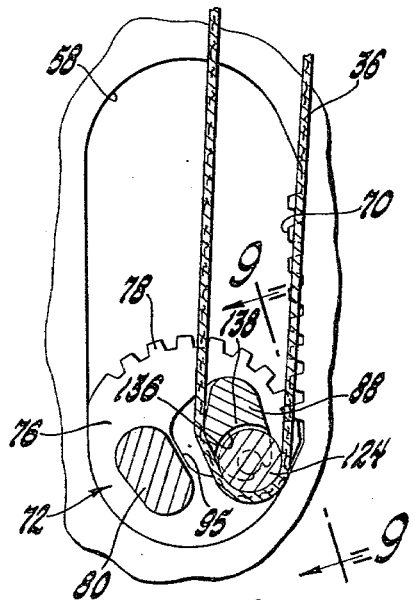
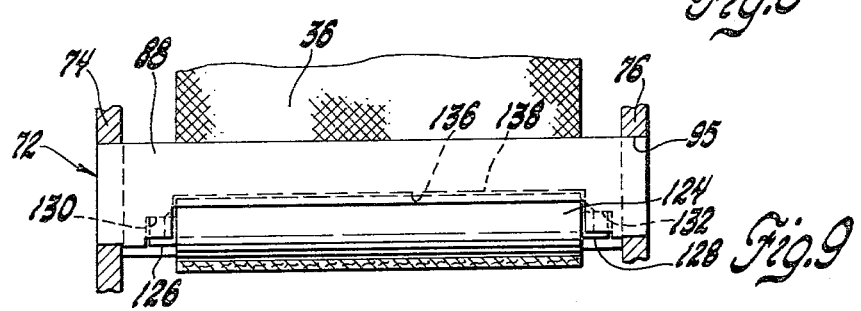

BELT ROLL-UP RETRACTOR

This invention relates to a vehicle inertia sensitive seat belt retractor and more particularly provides an associated mechanism for rolling-up and clamping the belt to prevent spool-out of the belt wound upon the retractor reel.

BACKGROUND OF THE INVENTION

It is well known to provide a passive seat belt system wherein one end of the belt is mounted inboard the seat and the outboard belt end is mounted on the door. A retractor is provided at one of the belt ends so that the belt is automatically wound and unwound between restraining and non-restraining positions by the swinging movement of the door. It is characteristic of such a passive belt system that many layers of belt are wound upon the retractor reel when the door is closed and the belt is in the restraining position. It has been observed in the prior art that the imposition of an occupant restraint load upon the belt subsequent to locking of the reel by a vehicle sensitive inertia locking mechanism causes the belt to tighten or spool-down on the reel and thereby extend the effective length of the restraint belt.

U.S. Pat. No. 4,120,466, issued Oct. 17, 1978 to Adomeit, discloses a self-actuating belt clamping device in which the belt is guided around the end of a lever so that imposition of an occupant restraint load on the belt pivots the lever to clamp the belt between a locking surface carried on the lever and a locking surface mounted on a fixed housing.

U.S. Pat. No. 4,032,174, issued June 28, 1977 to Andres, discloses a belt passing through a diametrically extending slot of a roller mounted on a fixed part of the vehicle body. Occurrence of a vehicle deceleration condition triggers a rotary drive device which rotates the roller to forcibly wind and retract the belt.

SUMMARY OF THE INVENTION

According to the present invention a seat belt retractor includes a belt reel rotatably mounted on a housing for belt winding and unwinding rotation. A winding spring rotates the reel in the belt winding direction. An inertia actuated reel locking means acts between the housing and the reel to selectively lock the reel against belt unwinding rotation so that a load imposed on the belt during restraint of an occupant tends to tighten or spool-down the would-up belt on the reel. A belt roll-up and clamp mechanism for limiting the extension of belt from the reel includes a spindle having pinion gears spaced apart by a pair of bars which define a slot through which the belt passes. The pinion gears mesh with toothed racks on the housing to effect rotation of the spindle simultaneous with linear movement of the spindle along the racks. A spring biases the spindle to a normal position at one end of the rack in which the rotary position of the spindle permits the belt to pass through the slot and slide around one of the bars during normal winding and unwinding of the belt from the reel. The imposition of occupant restraint load on the belt subsequent to reel lockup causes the spindle to move linearly and rotationally along the rack toward the reel so that the belt is rolled up around the spindle bars to thereby limit the extension of the belt from the reel by the occupant restraint load imposed thereon. One of the spindle bars is preferably mounted on the pinion gears for movement relative the other bar so that roll-up of the belt squeezes the movable bar toward the fixed bar to clamp the belt therebetween. The pinions preferably have abutment surfaces thereon adapted to engage the housing at the end of spindle travel to permit disengagement of the pinion teeth from the rack teeth so that the teeth need not be constructed to withstand the ultimate occupant restraint load.

The object, feature and advantage of the invention resides in a vehicle sensitive locking belt retractor having mechanism for rolling up and clamping a restraint belt which exits from a vehicle sensitive locking retractor.

Another object, feature and advantage of the invention resides in a belt roll-up mechanism wherein the belt passes through a slot in a belt spindle mounted by a rack and pinion to induce rotary belt roll-up rotation of the spindle when an occupant restraint load on the belt induces linear movement of the carriage along the rack.

A still further object, feature and advantage of the invention resides in a provision of a belt spindle having parallel spaced apart bars extending between pinion gears meshing with rack gears, one of the bars being movable toward the other to clamp the belt therebetween concomitant with belt roll-up inducing linear movement of the spindle along the rack during imposition of occupant restraint load upon the restraint belt.

Yet another object, feature and advantage of the invention resides in the provision of a belt spindle having parallel spaced apart bars extending between pinion gears meshing with rack gears, one of the bars defining a roller to promote winding and unwinding of the belt upon the retractor reel prior to imposition of an occupant restraint load thereon.

DESCRIPTION OF THE DRAWINGS

These and other objects, features and advantages of the invention will become apparent upon consideration of the specification and the drawings in which:

FIG. 1 is a side elevation view of a seat belt retractor having the belt roll-up device shown in the unlocked condition permitting normal belt winding and unwinding;

FIG. 2 is a view similar to FIG. 1 but showing lockup of the belt reel and roll-up of the belt on a belt spindle;

FIG. 3 is a view taken in the direction of arrows 3—3 of FIG. 2;

FIG. 4 is a sectional view taken in the direction of arrows 4—4 of FIG. 2 and showing the construction of the belt spindle;

FIG. 5 is a fragmentary perspective view corresponding to FIG. 1;

FIG. 6 is a view similar to FIG. 3 but showing a second embodiment of the invention;

FIG. 7 is a sectional view taken in the direction of arrows 7—7 of FIG. 6;

FIG. 8 is an enlarged fragmentary view similar to FIG. 7 showing a further modification of the invention; and FIG. 9 is a sectional view taken in the direction of arrows 9—9 of FIG. 8.

DESCRIPTION OF THE PREFERRED EMBODIMENT

Referring to FIGS. 1 and 3, there is shown a seat belt retractor generally indicated at 10 and including housing 12 having spaced apart side walls 14 and 16. The side walls 14 and 16 are connected together in spaced relation by an integral crossbar 18 and a spacer bar 24.

A belt reel, generally designated 28, includes a reel shaft 30 which extends through aligned apertures of the side walls 14 and 16 and has ratchet plates 32 and 34 attached thereto. The end of restraint belt 36 is attached to the reel shaft 30 intermediate the ratchet plates 32 and 34. A spiral spring 38 has an outer end attached to the housing side wall 14 by an anchor pin 40 and has an inner end suitably attached to the reel shaft 30 so that the spiral spring 38 rotates the belt reel 28 in the clockwise belt winding direction of rotation as viewed in FIG. 1.

A locking mechanism associated with the belt reel 28 includes a lock bar 42 which extends between side walls 14 and 16 and has end portions seated in triangular shaped apertures 44 of the side walls. The lock bar 42 has a normal position of FIG. 1 spaced away from engagement with ratchet teeth 45 of ratchet plates 32 and 34 and a raised position of FIG. 2 in which the lock bar 42 engages the aligned ratchet tooth 45 to lock the belt reel 28 against rotation in the belt unwinding direction. The lock bar 42 is moved to the raised position of FIG. 2 by a vehicle sensitive inertia sensor such as a pendulum or a ball, not shown.

Referring to FIGS. 1, 3 and 4, it is seen that a pair of plates 46 and 48 are juxtaposed respectively with the side walls 14 and 16 and secured thereto by rivets 50. A pair of spacer pins 52 and 54 and the spacer bar 24 extend between the plates 46 and 48 to maintain the precise lateral spacing therebetween. As best seen in FIG. 1, each of the plates 46 and 48 have aligned elongated apertures 58 as defined by spaced apart parallel side walls 60 and 62, a lower end wall 64 and an upper end wall 66. A plurality of rack teeth 70 are displayed along the side wall 60.

As best seen in FIGS. 1 and 4, a belt spindle 72 is mounted within the aligned apertures 58 of plates 46 and 48. The belt spindle 72 includes a pair of pinion gears 74 and 76 having teeth 78 and spaced apart by a pair of cylindrical bars 80 and 88. The bar 80 extends between the pinion gears 74 and 76 and has necked down rectangular end portions 82 and 84 which extend through mating rectangular apertures of the pinion gears. The bar 88 also extends between the pinion gears 74 and 76 and has necked down cylindrical end portions 90 and 92 which are captured within elongated bushings 94 and 96 carried by the pinion gears. The elongated bushings 94 and 96 mount the bar 88 for rotary movement and also for bodily movement toward and away from the bar 80. When the bar 88 is moved away from the bar 80, the slot 98 formed therebetween has a dimension greater than the thickness of the belt 36. When the bar 88 is moved to the opposite end of the elongated bushings 94 and 96, the thickness of the slot 98 between the bars 80 and 88 is less than the thickness of the belt 36.

Referring to FIGS. 1 and 4, it is seen that a spiral spring 100 is housed between spaced apart plastic walls 102 and 104. The spiral spring 100 has an inner end 106 suitably affixed to the bar 80 and a leg 109 which engages spacer pin 52. The spiral spring 100 urges rotation of the spindle 72 in the clockwise direction of rotation and away from the reel 28 to normally establish the pinion gears 74 and 76 in contact with the lower end wall 64 of the elongated apertures 58 of plates 46 and 48.

Referring to FIG. 1, it will be understood that the retractor is shown in the normal unlocked condition. The belt 36 extends from the reel 28, around the bar 88 of the spindle 72, and exits the retractor through an exit slot 112 of a belt guide 114. The end of the belt 36, not shown, is attached to the vehicle door. Extension of the belt 36 from the retractor is permitted by unwinding rotation of the reel 28 against the winding bias of the spiral spring 38. The bar 88 rotates about its end portions 90 and 92 as the belt 36 passes thereabout so that unwinding of the belt is not impeded.

When the motor vehicle experiences a rapid deceleration condition, the lock bar 42 is moved into locking engagement with the ratchet teeth 45 of the ratchet plates 32 and 34. The forward momentum of the seat occupant is restrained by the belt 36. The load on the belt induces movement of the belt spindle 72 along the aperture 58 in the direction generally toward the reel 28 and the belt exit slot 112. The occupant load on the belt acts through the moment arm equal to the distance between the centerline of the bar 88 and the pitch diameter of the pinion gears 74 and 76 to impart a counterclockwise rotary torque to the spindle 72. The meshing of the pinion gear teeth 78 with the rack teeth 70 cause the spindle 72 to move linearly up the rack teeth 70 while rotating in the counterclockwise direction. Movement of the spindle 72 from the position of FIG. 1 to the position of FIG. 2 causes the belt 36 to be progressively rolled up around the bars 80 and 88. Furthermore, as the belt rolls up around the bars, the bar 88 is forcibly shifted toward the position shown in FIG. 2 in which the belt 36 is clamped between the bars 80 and 88.

Referring to FIG. 2, it is seen that the linear and rotary movement of the spindle 72 is stopped when the pinion gears 74 and 76 engage the upper end wall 66 of the elongated aperture 58. More particularly, it will be seen that the pinion gears 74 and 76 have an abutment surface 108 adapted to engage the side wall 62 of the elongated slots 58 when the spindle 72 reaches the FIG. 2 position engaging the upper end wall 66. Engagement of the abutment surface 108 with the side wall 62 is effective to lock the spindle 72 from further rotary or linear movement. Furthermore, as seen in FIG. 2, the pinion teeth 78 and rack teeth 70 are configured to disengage from force transmitting engagement relative one another when the pinion gears 74 and 76 reach the FIG. 2 position. Accordingly, the belt load does not act upon the pinion teeth 78 or the rack teeth 70.

Upon cessation of the vehicle deceleration condition and the occupant load against the restraint belt 36, the spiral spring 100 returns the spindle 72 to the position in FIG. 1, thereby unrolling the restraint belt from the bars 80 and 88 and allowing the bar 88 to shift away from bar 80 to unclamp the belt. Accordingly, the belt 36 may pass freely through the belt slot 98 between the bars 80 and 88 during subsequent winding and unwinding of the belt from the reel.

Referring to FIGS. 6 and 7, there is shown a second embodiment of the invention. The retractor shown in FIGS. 6 and 7 has a pair of side-by-side mounted reels 28 and is particularly suited for mounting on the transmission tunnel of the vehicle body for winding first belt 36 having an outboard end attached to the driver door and a second belt 36 having its outboard end attached to the passenger door. The embodiment of FIGS. 6 and 7 is constructed in a generally similar fashion to that of FIG. 1 and has like elements designated by like numerals.

As seen in FIGS. 6 and 7, the reel shaft 30 is relatively small in diameter in recognition of the fact that the belt roll-up and clamping mechanism of this invention prevents the reel 28 from being subjected to a high level of belt loading normally experienced in vehicle sensitive locking retractors. Furthermore, each reel 28 has only a single ratchet plate 32 engageable by a lightweight lock bar 42 mounted upon a plastic support member 115. Pendulum 116 has a head 118 which rests within a compensating sleeve 120 supported on the support member 115. The lock bar 42 carries an adjusting clip 122 which supports the lock bar 42 at a precise distance relative the pendulum head 118 and ratchet plate 32. A vehicle deceleration of predetermined level causes the pendulum 116 to tilt and thereby raise the lock bar 42 into engagement with the ratchet plate 32.

The embodiment of FIGS. 6 and 7 is also different from the embodiment of FIGS. 1-5 in that the shape and mounting of the spindle bars 80 and 88 is different. The bar 80 has an elliptical cross-section and has its ends fixedly attached to the pinion gears 74 and 76. The bar 88 is of elliptical cross-section and has its ends extending through triangular shaped apertures 95 of the pinion gears 74 and 76 so that the bar 88 is pivoted between the position shown in the right-hand side of FIG. 7 spaced away from the fixed bar 80 by more than a belt thickness and the position shown in the left-hand side of the FIG. 7 in which the bar 88 is pivoted toward the bar 80 to clamp the belt 36 therebetween.

Upon comparison of the embodiments of FIGS. 1-5 and FIGS. 6 and 7, it will be understood that the extent to which the belt is rolled about the spindle 72 is dependent upon a number of factors including the shape of the bars 80 and 88 and the angular orientation and length of the elongated apertures 58 which confine the motion of the spindle 72. Furthermore, it will be appreciated that the surface treatment of the bars 80 and 88 may be varied to obtain the desired level of belt clamping. For example, the surface of one or both rods may be knurled, teflon coated or otherwise treated in a manner known to those skilled in the art.

Referring to FIGS. 8 and 9, a further modification of the FIGS. 6 and 7 embodiment of the invention is shown wherein a roller 124 is provided on the cylindrical bar 88. As best seen in FIG. 9, the roller 124 has integral axle projections 126 and 128 at its ends which seat within journal recesses 130 and 132 of the bar 88. Furthermore, the bar 88 has a central recessed portion 136 defined by a curvilinear wall 138 which is spaced closely adjacent the surface of the roller 124.

Referring to FIG. 8, it will be understood that the roller 124 rotates about the axle projections 126 and 128 during winding and unwinding of the belt 36 from the belt reel 28. Accordingly, the frictional resistance to winding and unwinding of the belt 36 is lessened by the roller 124 as compared with the frictional resistance experienced in sliding movement of the belt over the bar 88 as shown in FIG. 7. The roller 124 is constructed in a manner to enable it to yield toward the curvilinear wall 138 of bar 88 when the retractor experiences a level of belt loading indicative of restraint of the occupant. Accordingly, the outer surface of the roller 124 is carried into engagement with the curvilinear wall 138 of the bar 88 to frictionally retard rotation of the roller 24 and thereby enhance the clamping of the belt 36 between the roller 124 and the fixed cylindrical bar 80 when the bar 88 pivots within the triangular shaped apertures 95 of the pinion gears 74 and 76.

It is characteristic of the invention that the sequence of first wrapping the belt around the bars 80 and 88 of the spindle 72 and then clamping the belt between the bars by shifting movement of the bar 88 substantially limits the extent to which the belt 36 is extended from the retractor subsequent to engagement of the lock bar 42 with the ratchet plates 32 and 34. For example, the mechanism disclosed herein has reduced the amount of belt spool out from about 6 inches to about 1½ inches. Clamping of the belt subsequent to wrapping of the belt has been shown to significantly lessen the possibility of abraiding the belt.

While the invention has been disclosed herein primarily in terms of the specific embodiment shown in the drawing, it is not intended to be limited thereto, but rather only to the extent set forth in the appended claims. For example, the belt spindle may be comprised of a slotted plate extending between the pinion gears, in which case the belt is merely rolled up around the slotted plate without provision of the additional feature of clamping the belt.

The embodiments of the invention in which an exclusive property or privilege is claimed are defined as follows:

1. A seat belt retractor for winding and unwinding a restraint belt comprising:
   a housing;
   a belt reel rotatably mounted on the housing for belt winding and unwinding rotation;
   reel locking means acting between the housing and the reel to selectively lock the reel against belt winding rotation so that a load is imposed on the belt during restraint of an occupant;
   a spindle having a slot through which the belt passes during belt winding and unwinding rotation of the reel;
   means mounting the spindle on the housing for bodily movement relative the housing when a load is imposed on the belt;
   and means acting between the housing and the spindle to effect rotation of the spindle simultaneous with the bodily movement of the spindle whereby the belt is rolled around the spindle to cinch the belt against movement in the unwinding direction independently of the locking of the reel by the reel locking means.

2. A seat belt retractor for winding and unwinding a restraint belt comprising:
   a housing;
   a belt reel rotatably mounted on the housing for belt winding and unwinding rotation;
   reel locking means acting between the housing and the reel to selectively lock the reel against belt unwinding rotation so that a load is imposed on the belt during restraint of an occupant;
   a spindle having first and second bars spaced apart to define a slot through which the belt passes, the first bar being mounted for movement between an unclamping position spaced away from the second bar and a clamping position spaced closely adjacent the first bar to clamp the belt therebetween;
   means mounting the spindle on the housing for linear movement relative the housing when a load is imposed on the belt;
   and rack and pinion means acting between the housing and the spindle to effect rotation of the spindle simultaneous with the linear movement of the spindle by the load so that the belt is rolled around the spindle and squeezes the movable first bar into the clamping position relative the second bar whereby the belt is rolled up around the spindle and clamped between the spindle bars to cinch the belt against extension from the retractor independently of the locking of the reel by reel locking means.

3. A seat belt retractor for winding and unwinding a restraint belt comprising:
a housing having spaced apart walls;
a belt reel extending between the housing walls and rotatably mounted thereon for belt winding and unwinding rotation;
a belt spindle having first and second bars extending between first and second pinion gears, said bars being spaced apart to define a belt passage slot;
first and second toothed racks carried by the housing walls and meshing respectively with the first and second pinion gears to simultaneously rotate and translate the spindle;
spring means urging the spindle to the end of the toothed rack farthest away from the reel to a position in which the belt passes through the spindle slot and around one of the spindle bars during belt winding and unwinding rotation of the reel;
and reel locking means acting between the housing and the reel to selectively lock the reel against belt winding rotation so that a load is imposed on the belt during restraint of an occupant and induces movement of the spindle along the toothed racks in the direction towards the reel so that the spindle is rotated and rolls up the belt to cinch the belt against movement through the spindle slot.

4. A seat belt retractor for winding and unwinding a restraint belt comprising:
a housing having an opening therein for entry and exit of the belt;
a belt reel rotatably mounted on the housing for winding and unwinding the belt;
reel locking means acting between the housing and the reel to selectively lock the reel against belt unwinding rotation;
a spindle having a belt slot therethrough;
means mounting the spindle on the housing for limited bodily movement along the housing between a first position relatively further away from the reel and housing opening and a second position relatively closer to the reel and housing opening;
and rack and pinion means acting between the housing and the spindle, said rack and pinion means being adapted to rotationally orient the spindle at the first position to permit free belt passage through the spindle slot during belt winding and unwinding and adapted to effect rotation of the spindle simultaneous with the bodily movement of the spindle toward the reel and the housing opening by the belt load imposed on the belt during occupant restraint subsequent to locking of the reel locking means whereby the belt is rolled up around the spindle to cinch the belt against extension from the retractor independently of the locking of the reel by reel locking means.

5. A seat belt retractor for winding and unwinding a restraint belt comprising:
a housing having spaced apart walls;
a belt reel extending between the housing walls and rotatably mounted thereon for belt winding and unwinding rotation;
a belt spindle having first and second bars extending between first and second pinion gears, said bars being spaced apart to define a belt passage slot;
first and second toothed racks carried by the housing walls and meshing respectively with the first and second pinion gears to define a path of concomitant spindle rotation and translation;
spring means urging the spindle to the end of the toothed rack farthest away from the reel to a position in which the belt passes through the spindle slot and around one of the spindle bars during belt winding and unwinding rotation of the reel;
reel locking means acting between the housing and the reel to selectively lock the reel against belt winding rotation so that a load is imposed on the belt during restraint of an occupant and induces movement of the spindle along the toothed racks in the direction towards the reel so that the spindle is rotated by the meshing pinion gears and toothed racks to roll-up and cinch the belt against movement through the spindle slot;
and abutment means independent of the meshing gear and rack teeth acting between the spindle and the housing and adapted to limit rotary movement and translationary movement of the spindle in the direction toward the reel.

6. A seat belt retractor for winding and unwinding a restraint belt comprising:
a housing having spaced apart walls;
a belt reel extending between the housing walls and rotatably mounted thereon for belt winding and unwinding rotation;
a belt spindle having first and second bars extending between first and second pinion gears, said bars being spaced apart to define a belt passage slot;
first and second toothed racks carried by the housing walls and meshing respectively with the first and second pinion gears to simultaneously rotate and translate the spindle;
spring means urging the spindle to the end of the toothed rack farthest away from the reel to a position in which the belt passes through the spindle slot and around the first spindle bar during belt winding and unwinding rotation of the reel;
means associated with the first spindle bar to define a roller adapted to be rotated by belt winding and unwinding;
and reel locking means acting between the housing and the reel to selectively lock the reel against belt winding rotation so that a load is imposed on the belt during restraint of an occupant and induces movement of the spindle along the toothed racks in the direction towards the reel so that the spindle is rotated and rolls up the belt to cinch the belt against movement through the spindle slot.

* * * * *